N. F. MATHEWSON.

Improvement in Seats for Harvesters.

No. 5,094. Reissued Oct. 8, 1872.

*Witnesses:*

R. H. Whittlesey

J. Williams

*Inventor:*

N. F. Mathewson by his Atty

Wm. D. Baldwin

UNITED STATES PATENT OFFICE.

NATHAN F. MATHEWSON, OF BLOOMINGTON, ILLINOIS, ASSIGNOR, BY MESNE ASSIGNMENTS, TO JOHN E. ATWOOD.

IMPROVEMENT IN SEATS FOR HARVESTERS.

Specification forming part of Letters Patent No. 88,653, dated April 6, 1869; reissue No. 5,094, dated October 8, 1872.

DIVISION B.

*To all whom it may concern:*

Be it known that I, NATHAN F. MATHEWSON, formerly of Barrington, in the county of Bristol and State of Rhode Island, but now residing at Bloomington, in the county of McLean and State of Illinois, have invented a new and useful Improvement in Mowing-Machines, of which the following is a specification:

The invention which forms the subject-matter of this division relates to the driver's seat; its object being to secure an easy riding seat, and one readily adjustable by the driver while the machine is in motion; and the improvement consists in combining a vertically-movable seat-standard with a pedal-catch acting directly upon it, as hereinafter set forth.

The accompanying drawing represents so much only of a machine embodying my improvement as is necessary to illustrate the invention claimed, which may obviously be adapted to almost any of the machines now in use.

Figure 1:
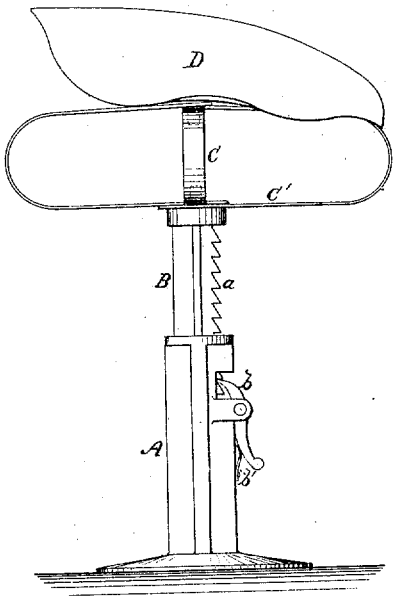
Figure 2:
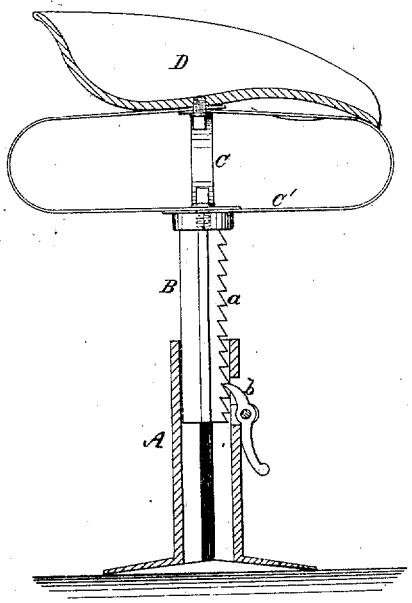
Figure 3:
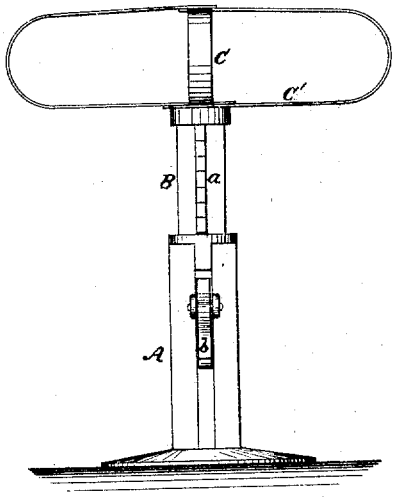
Figure 4:
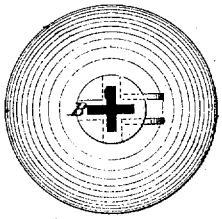

Figure 1 represents a side view of the driver's seat and its supports; Fig. 2, a vertical section through the same; Fig. 3, a front view thereof; and Fig. 4, a plan view of the supporting-post.

A hollow post, A, supports a standard, B, cross-shaped in cross-section and movable endwise in a corresponding socket in the post, and carrying a ratchet, *a*, into which a pedal-catch, *b*, pivoted on the post, takes to hold the standard at any desired elevation. A spring, *b'*, keeps the catch engaged with the ratchet. Elliptic springs C C' secured upon the standard B, transversely to each other, support a seat, D, of well-known construction.

By this mode of construction the driver can lower the seat at any time by releasing the catch with his foot, leaving his hands free to manipulate the team and machine.

I am aware that a seat has heretofore been raised or lowered by a rack and pinion operated by hand; but my improvement is useful in enabling the driver to use his foot instead of his hand. My arrangement of springs causes the seat to ride easily; but I do not claim this feature.

I claim—

The combination of the post, the seat-supporting standard movable endwise therein, its rack, and the pedal-catch, substantially as set forth, to enable the driver to lower the seat by his foot.

NATHAN F. MATHEWSON.

Witnesses:

WALTER B. VINCENT,

JAMES H. PARSONS.